(12) United States Patent
El-Ghannam et al.

(10) Patent No.: US 11,292,749 B2
(45) Date of Patent: Apr. 5, 2022

(54) COMPOSITE CARBIDE COMPOSITIONS AND METHODS OF MAKING THE SAME

(71) Applicant: The University of North Carolina at Charlotte, Charlotte, NC (US)

(72) Inventors: Ahmed El-Ghannam, Charlotte, NC (US); Tony Schmitz, Matthews, NC (US)

(73) Assignee: THE UNIVERSITY OF NORTH CAROLINA AT CHARLOTTE, Charlotte, NC (US)

(*) Notice: Subject to any disclaimer, the term of this patent is extended or adjusted under 35 U.S.C. 154(b) by 45 days.

(21) Appl. No.: 16/478,641

(22) PCT Filed: Jan. 18, 2018

(86) PCT No.: PCT/US2018/014234
§ 371 (c)(1),
(2) Date: Jul. 17, 2019

(87) PCT Pub. No.: WO2018/136631
PCT Pub. Date: Jul. 26, 2018

(65) Prior Publication Data
US 2020/0385313 A1 Dec. 10, 2020

Related U.S. Application Data

(60) Provisional application No. 62/542,473, filed on Aug. 8, 2017, provisional application No. 62/447,641, filed on Jan. 18, 2017.

(51) Int. Cl.
C04B 35/565 (2006.01)
C04B 35/626 (2006.01)
(Continued)

(52) U.S. Cl.
CPC ........ *C04B 35/565* (2013.01); *C04B 35/6265* (2013.01); *C04B 35/62807* (2013.01);
(Continued)

(58) Field of Classification Search
CPC .............. C04B 35/565; C04B 35/6265; C04B 35/62807; C04B 35/6316;
(Continued)

(56) References Cited

U.S. PATENT DOCUMENTS 2,040,236 A * 5/1936 Benner ................. C04B 35/565
501/89
6,001,756 A * 12/1999 Takahashi ............. C04B 35/575
501/90
(Continued)

FOREIGN PATENT DOCUMENTS

CN    104973873    * 10/2015
EP    1728774      * 12/2006
(Continued)

OTHER PUBLICATIONS

CN 104973873 Machine Translation (Year: 2015).*
(Continued)

*Primary Examiner* — Karle E Group
*Assistant Examiner* — Cameron K Miller
(74) *Attorney, Agent, or Firm* — J. Clinton Wimbish; Nexsen Pruet, PLLC (57) ABSTRACT

In one aspect, composite carbide compositions are described herein which can facilitate the efficient and/or economical manufacture of articles comprising SiC. Briefly, a composite carbide composition comprises silicon carbide (SiC) particles and a silica interparticle phase covalently bonded to the SiC particles.

26 Claims, 9 Drawing Sheets

(51) Int. Cl.
    *C04B 35/628*     (2006.01)
    *C04B 35/63*     (2006.01)
    *B82Y 30/00*     (2011.01)

(52) U.S. Cl.
    CPC .......... *C04B 35/6316* (2013.01); *B82Y 30/00* (2013.01); *C04B 2235/3826* (2013.01); *C04B 2235/5232* (2013.01); *C04B 2235/5292* (2013.01); *C04B 2235/5436* (2013.01); *C04B 2235/5454* (2013.01); *C04B 2235/5472* (2013.01)

(58) Field of Classification Search
    CPC .... C04B 2235/3826; C04B 2235/5232; C04B 2235/5292; C04B 2235/5436; C04B 2235/5454; C04B 2235/5472; B82Y 30/00
    See application file for complete search history.

(56) References Cited

U.S. PATENT DOCUMENTS

| | | | |
|---|---|---|---|
| 2008/0057268 A1* | 3/2008 | Lu | C04B 35/195 428/116 |
| 2009/0305017 A1* | 12/2009 | His | C04B 38/10 428/220 |
| 2014/0206525 A1* | 7/2014 | Chaouki | C04B 38/0045 501/88 |

FOREIGN PATENT DOCUMENTS

| | | | | |
|---|---|---|---|---|
| EP | 1728774 | A1 * | 12/2006 | ......... C04B 35/6316 |
| EP | 1728774 | A1 | 12/2006 | |
| EP | 2138474 | A1 * | 12/2009 | ......... C04B 35/6263 |
| EP | 2138474 | A1 | 12/2009 | |
| EP | 2138474 | * | 8/2018 | |
| JP | 3368960 | B2 * | 1/2003 | ......... C04B 35/6263 |
| JP | 3368960 | B2 | 1/2003 | |

OTHER PUBLICATIONS

Merriam-Webster definition of Modulus (Year: 2021).*
Wikipedia—Oxycarbide glass (Year: 2021).*
International Search Report and Written Opinion corresponding to PCT/US2018/014234, dated Aug. 1, 2018, 12 pages.
She et al., "High-Strength Porous Silicon Carbide Ceramics by an Oxidation-Bonding Technique", Journal of the American Ceramic Society, vol. 85 Issue 11 (Nov. 2002): entire document, but especially: pp. 2852-2854; abstract, p. 2854, col. 1, para 2, fig. 3.

* cited by examiner

COMPOSITE CARBIDE COMPOSITIONS AND METHODS OF MAKING THE SAME

RELATED APPLICATION DATA

This application is a U.S. National Phase of PCT/US2018/014234, filed Jan. 18, 2018, which claims priority pursuant to 35 U.S.C. § 119(e) to U.S. Provisional Patent Application Ser. No. 62/447,641 filed Jan. 18, 2017 and U.S. Provisional Patent Application Ser. No. 62/542,473 filed Aug. 8, 2017, each of which is incorporated herein by reference in their entireties.

FIELD

The present invention relates to composite carbide materials and, in particular, to silicon carbide composite materials including a silica interparticle phase.

BACKGROUND

Silicon carbide (SiC) offers high elastic modulus, low density, low coefficient of thermal expansion (CTE) and high thermal conductivity. These properties render SiC a versatile material operable for use in many demanding applications. SiC, for example, is used in lightweight mirrors and structural components for ground- and space-based imaging systems, such as telescopes and satellites. The ability to match materials between the mirrors and support structure is ideal because issues with mismatched CTEs and the corresponding thermal distortion induced by temperature variations and gradients are minimized SiC is also employed in ballistic applications, including vehicle and body armor.

While SiC offers desirable material properties, difficulties in manufacturing articles from SiC limit its widespread application. Articles, for example, can be fabricated by hot pressing SiC. In this process, micrometer-scale α-SiC particles are consolidated in a mold a high temperature (>2000° C.) and high pressure (1000-2000 atm). Sintering aids and grain growth inhibitors are used to increase density of the sintered article. Grinding or diamond machining is then used to place the article in final form. Polishing and lapping may also be employed to produce desired surface quality. Material removal rates of SiC are low due to its high wear resistance, thereby substantially increasing final processing times. Protracted processing times coupled with high temperature and high pressure sintering substantially increases cost of SiC articles.

SiC articles can also be fabricated by reaction bonding techniques. In this technique, α-SiC phase slurry is slip cast injected into a mold with the negative of the desired geometry. The green part is removed from the mold and optionally machined to the desired geometry. The green part is subsequently sintered for article completion. While post-sinter processing is minimized in this technique, the mold can be expensive and cost-prohibitive for limited production volumes of the article.

SUMMARY

In one aspect, composite carbide compositions are described herein which can facilitate efficient and/or economical manufacture of articles comprising SiC. Briefly, a composite carbide composition comprises silicon carbide (SiC) particles and a silica interparticle phase covalently bonded to the SiC particles. As described further herein, the silica interparticle phase can be crystalline and exhibit fiber and/or plate-like morphologies. Various articles can comprise or be formed from the composite carbide composition including, but not limited to, optical apparatus for sensing and imaging systems as well as armor for vehicle and body applications.

In another aspect, methods of making composite carbide compositions are described. A method of making a composite carbide composition comprises providing SiC particles, oxidizing the SiC particles forming surface silanol functionalities and heating the oxidized SiC particles to produce a crystalline silica interparticle phase covalently bonded to the SiC particles. In some embodiments, the silica interparticle phase bridges SiC particles.

Methods of making composite carbide articles are also described. A method of making a composite carbide article comprises forming a green article by successively depositing a plurality of layers of SiC particles, wherein liquid oxidant-binder is selectively deposited on each layer according to design of the composite carbide article in electronic format. The green article is heated to produce the composite carbide article comprising a crystalline silica interparticle phase covalently bonded to the SiC particles.

These and other embodiments are further described in the following detailed description.

DETAILED DESCRIPTION

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

I. Composite Carbide Compositions

In one aspect, composite carbide compositions are described herein. A composite carbide composition comprises silicon carbide (SiC) particles and a silica interparticle phase covalently bonded to the SiC particles. Turning now to specific components, SiC particles of the composition can have any desired shape or morphology. In some embodiments, for example, the SiC particles exhibit irregular shape, having sharp surface transitions or edges and polygonal morphology. Alternatively, the SiC particles can be generally spherical or elliptical, exhibiting smooth surface transitions. SiC particles of the composite composition can also be a mixture of irregular shape and spherical/elliptical particles, in some embodiments. SiC particles of the composite composition can have any desired size including particles having millimeter dimensions, micron dimensions or nanoparticle dimensions or mixtures thereof. Size of the SiC particles can be selected according to several considerations including, but not limited to, desired structural features and properties of the composite carbide composition such as density, pore size and strength. In some embodiments, the SiC particles have an average size of 20-150 μm or 40-100 μm. Alternatively, the SiC particles can have a bi-modal or multi-modal size distribution. The SiC particles, for example, can be a mixture of SiC microparticles and SiC nanoparticles. When present, SiC nanoparticles can have an average size of 50-250 nm or 80-200 nm. In some embodiments, SiC nanoparticles constitute up to 70 weight percent of the SiC particles in the composite carbide composition, with the remainder being SiC microparticles. Weight percent of SiC nanoparticles can also have a value selected from Table I.

TABLE I

| wt. % SiC Nanoparticles |
| --- |
| 5-70 |
| 10-65 |
| 20-60 |
| 15-50 |
| 20-40 |
| 25-35 |

Figure 1:
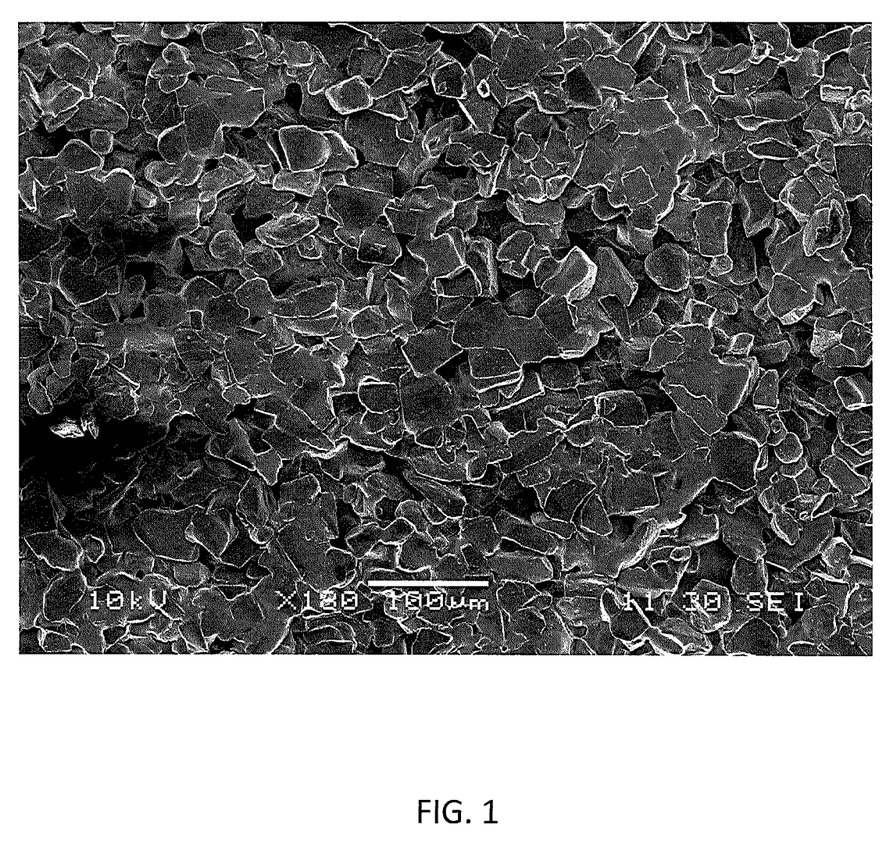
FIG. 1 illustrates a scanning electron microscopy (SEM) image of a mixture of SiC microparticles and SiC nanoparticles according to some embodiments.

As detailed further herein, SiC nanoparticles can fill pores and/or spaces between SiC microparticles, thereby increasing particle packing density of the composite carbide composition. SiC nanoparticles can also provide enhanced surface area for nucleation and growth of the silica interparticle phase. FIG. 1 illustrates an SEM image of a mixture of SiC microparticles and SiC nanoparticles according to some embodiments. SiC nanoparticles are present in the mixture in an amount of 20 weight percent. In further embodiments SiC particles can be a mixture of SiC particles of millimeter size and SiC microparticles and/or SiC nanoparticles. The microparticles and/or nanoparticles can fill pores and spaces between the millimeter size SiC particles.

Figure 2:
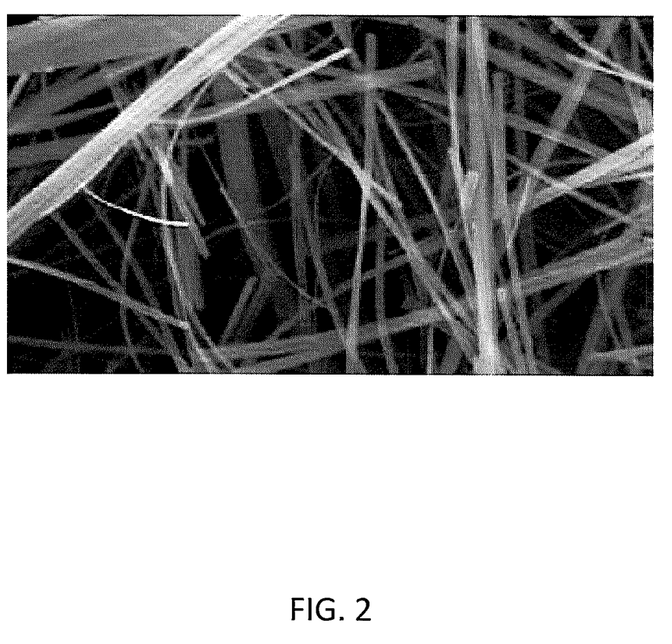
FIG. 2 is an SEM image of silica interparticle phase having fiber morphology according to some embodiments.
Figure 3:
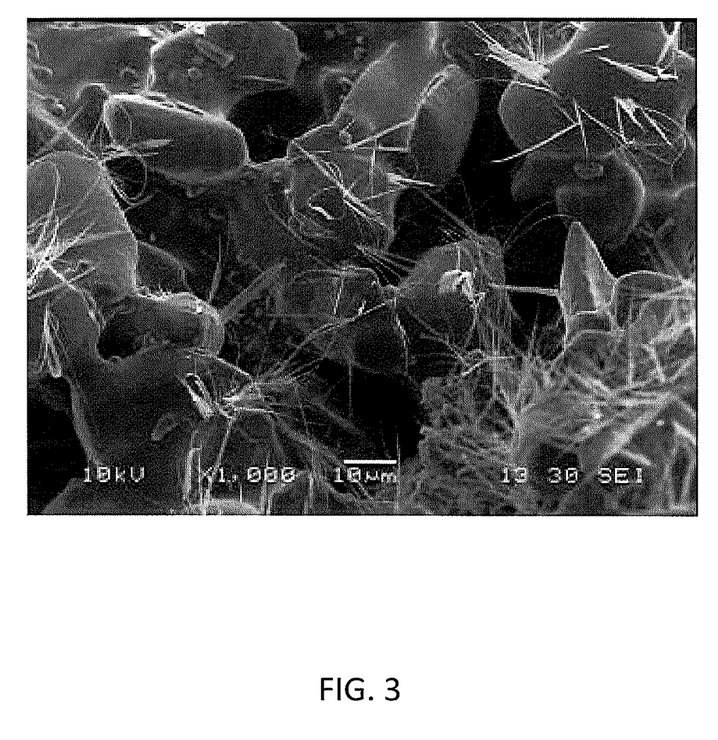
FIG. 3 is an SEM image illustrating silica interparticle phase of fiber morphology bridging multiple SiC particles according to some embodiments.
Figure 4:
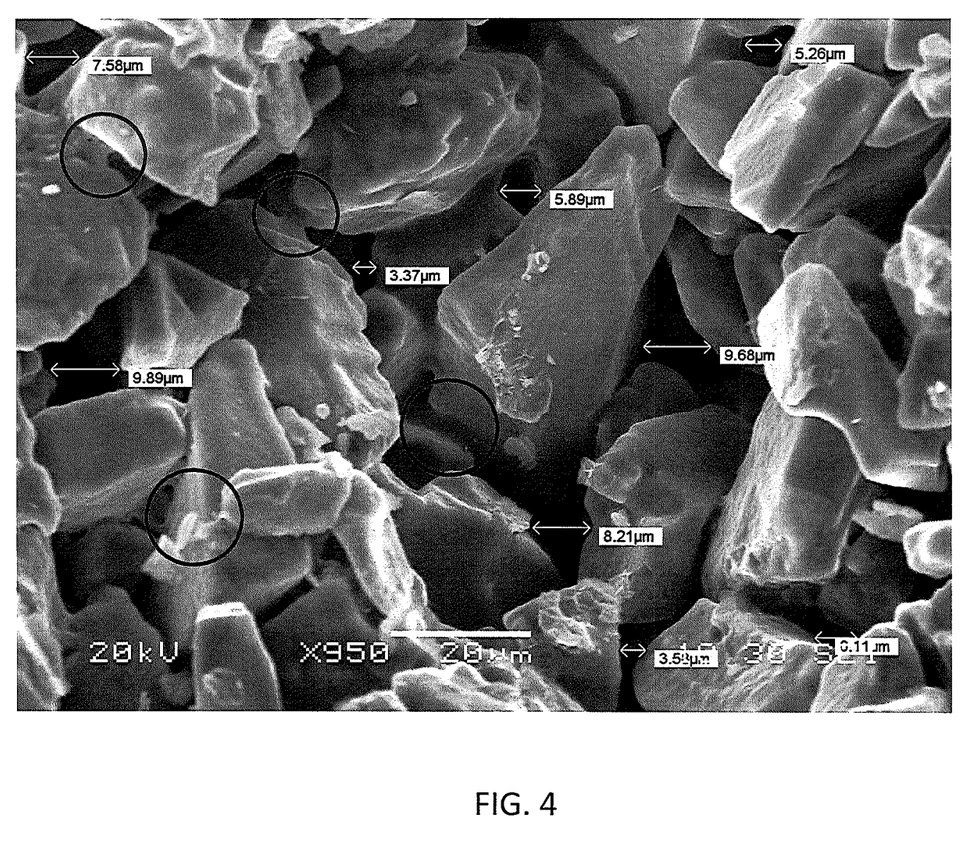
FIG. 4 is an SEM image displaying fusing of SiC particles by the silica interparticle phase at various locations in the composite carbide composition according to some embodiments.

As described herein, a composite carbide composition includes a silica interparticle phase covalently bonded to the SiC particles. In some embodiments, the silica interparticle phase is crystalline. Moreover, the silica interparticle can exhibit fiber morphology, plate-like morphology or mixtures thereof. FIG. 2 is an SEM image of silica interparticle phase having fiber morphology according to some embodiments. The silica interparticle phase bridges SiC particles, in some embodiments. In bridging SiC particles, a single fiber and/or plate of the silica interparticle phase can be covalently attached to at least two SiC particles. FIG. 3 is an SEM image illustrating silica interparticle phase of fiber morphology bridging multiple SiC particles according to some embodiments. In some embodiments, plate morphology of the silica interparticle phase can fuse SiC particles. FIG. 4 is an SEM image displaying fusing of SiC particles by the silica interparticle phase at various locations in the composite carbide composition according to some embodiments. The circles in the SEM image indicate silica fusion regions between the SiC particles.

The silica interparticle phase, in some embodiments, comprises one or more dopants. Dopant of the silica interparticle phase can include various elemental species including alkali metal, alkali-earth metals, transition metals and/or Group IIIA elements such as boron and aluminum. For example, the silica phase can comprise sodium (Na) or zirconium, in some embodiments. In some embodiments, aluminum is incorporated into the silica interparticle phase as alumina. Dopant of the silica interparticle phase, in some embodiments, may derive from oxidant employed to oxidize SiC particles, as described further below.

Figure 5A:
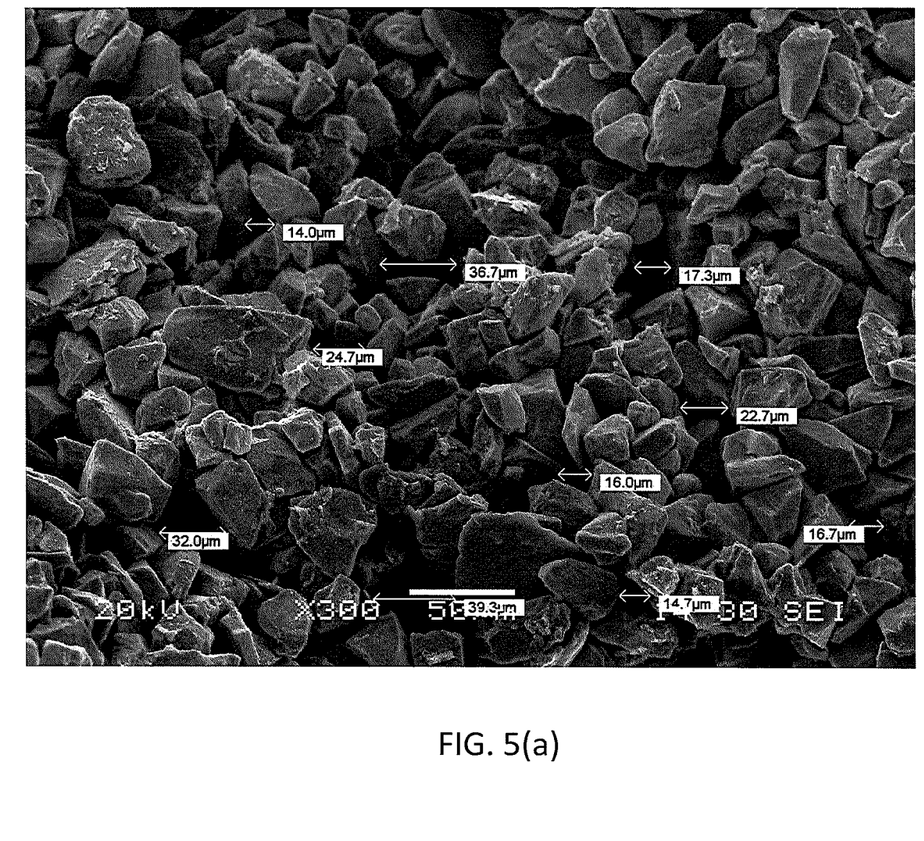
FIG. 5(a) is an SEM image of a mixture of SiC particles prior to growth of the silica interparticle phase according to some embodiments.
Figure 5B:
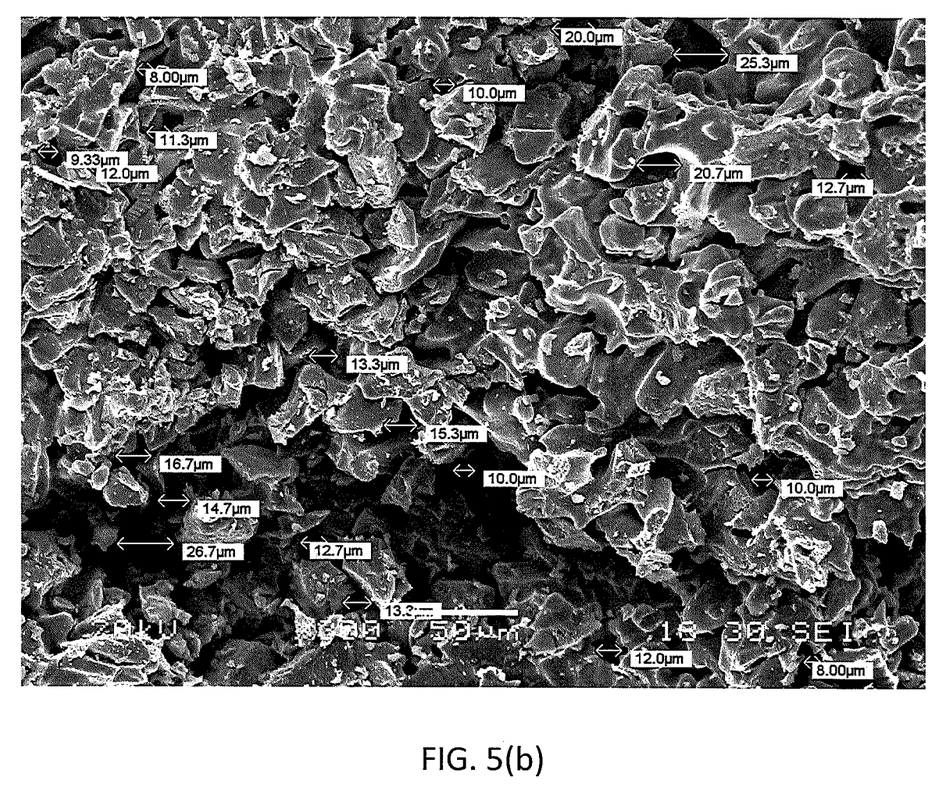
FIG. 5(b) is an SEM image of SiC particles after growth of the silica interparticle phase at 1000° C. for 2 hours according to some embodiments.

Growth of the silica interparticle phase can reduce and/or occlude pore structure in the composite carbide composition. FIG. 5(a) is an SEM image of a mixture of SiC particles prior to growth of the silica interparticle phase. As provided in FIG. 5(a), pore size ranges from about 10-80 μm. FIG. 5(b) is an SEM image of the SiC particles after growth of the silica interparticle phase at 1000° C. for 2 hours, wherein pore sizes are reduced to 0.1-28 μm. Growth of the silica interparticle phase also enhances density and strength of the composite carbide composition. As detailed further herein, growth of the silica interparticle phase can be enhanced by increasing temperature and/or time of the heat treatment. After completion of silica interparticle phase growth, the composite carbide composition can have density approaching the density of silicon carbide. In some embodiments, a composite carbide composition has density greater than 80 percent theoretical density of silicon carbide. Moreover, a composite carbide composition can have compressive strength of at least 50 MPa, in some embodiments. Compressive strength of a composite carbide composition may also range from 50-200 MPa depending on processing conditions and associated growth time of the silica interparticle phase. Additionally, a composite carbide composition described herein can exhibit modulus of at least 5 GPa. Modulus of a composite carbide composition may also range from 5-10 GPa or 6-8 GPa, in some embodiments.

II. Methods of Making Composite Carbide Compositions

In another aspect, methods of making composite carbide compositions are described. A method of making a composite carbide composition comprises providing SiC particles, oxidizing the SiC particles forming surface silanol functionalities and heating the oxidized SiC particles to produce a crystalline silica interparticle phase covalently bonded to the SiC particles. Composite carbide compositions made according to methods described herein can have any properties and/or features described in Section I above.

Turning now to specific steps, SiC particles can be provided as microparticles or a mixture of microparticles and nanoparticles, as set forth in Section I. The SiC particles are oxidized by any oxidant operable to participate in formation of surface silanol functionalities, [Si(OH)$_x$] wherein x is 1 to 4. In some embodiments, for example, the SiC particles are contacted with liquid oxidizing agent. Liquid oxidizing can comprise alkali metal hydroxide including, but not limited to, NaOH solution. Depending desired oxidation parameters, NaOH may be present in aqueous solution at various concentration. Table II provides several NaOH concentrations according to some embodiments.

TABLE II

| Aqueous NaOH Solution (% w/v) |
| --- |
| 1 |
| 5 |
| 10 |
| 15 |
| 20 |
| 25 |
| 1-30 |

Other liquid oxidants are also possible for the production of surface silanol functionalities on the SiC particles. Alternatively, gaseous oxidant may be employed to form the surface silanol functionalities. Gaseous oxidant may be flowed through the bed or layer of SiC particles to provide sufficient oxidation and formation of silanol functionalities. Alkali hydroxide solution may be vaporized for contacting the SiC particles, in some embodiments.

Figure 6:
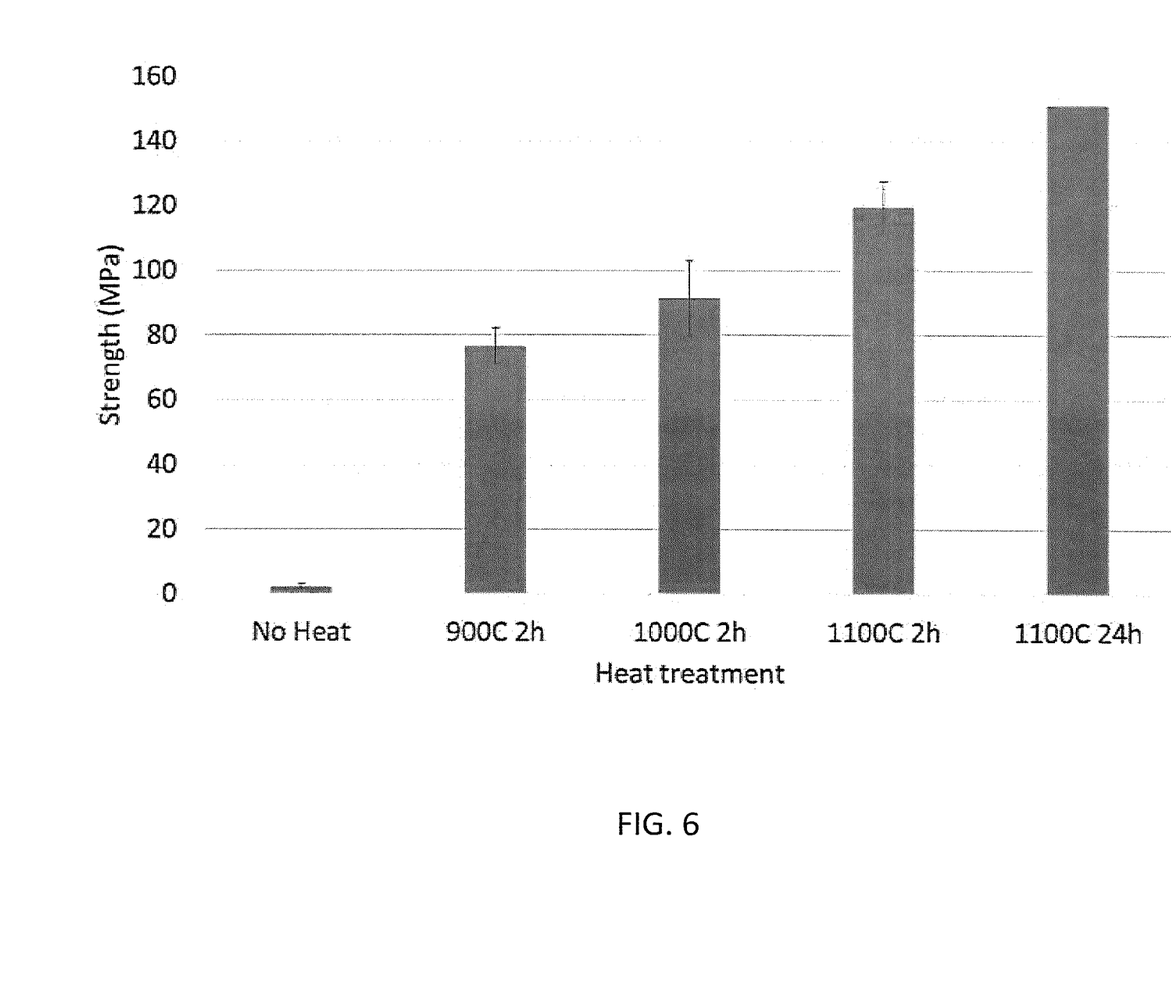
FIG. 6 illustrates change in compressive strength of composite carbide compositions as a function of heating temperature and time according to some embodiments.
Figure 7:
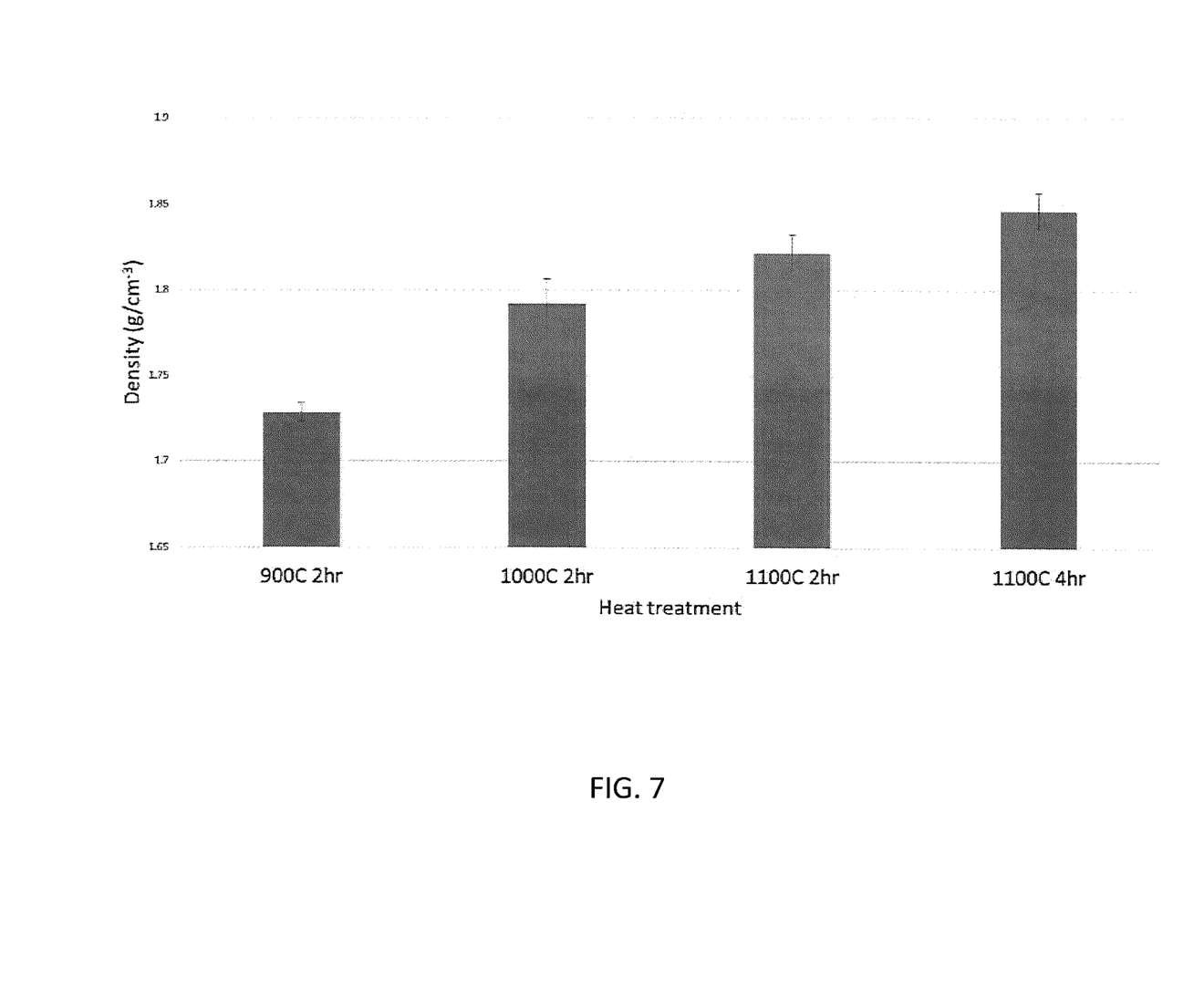
FIG. 7 illustrates change in density of composite carbide compositions as a function of heating temperature and time according to some embodiments.
Figure 8:
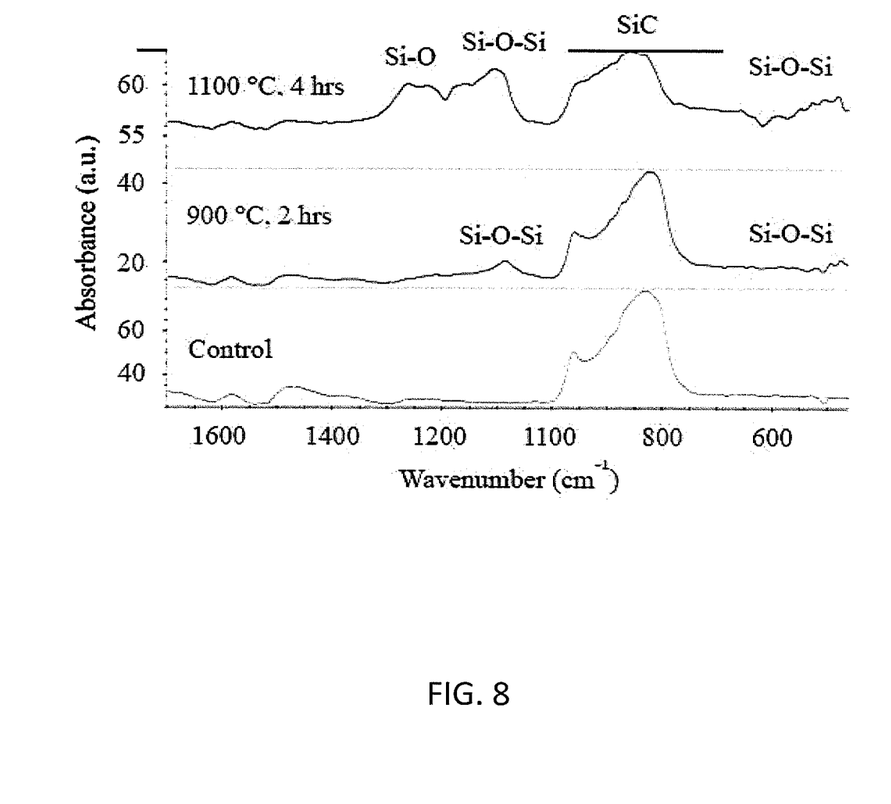
FIG. 8 provides Fourier transform infrared (FTIR) spectra of two composite carbide compositions heated at differing temperatures and over differing time periods in comparison to a control group of non-oxidized SiC particles.

The oxidized SiC particles are heated in an oxygenated atmosphere, such as ambient atmosphere, to produce a crystalline silica interparticle phase covalently bonded to the SiC particles. The silica interparticle phase can have any properties and/or morphology detailed in Section I above. The silica interparticle phase, for example, can exhibit fiber and/or plate-like morphology and bridge SiC particles. The oxidized SiC particles can be heated to any desired temperature operable to form the silica interparticle phase. In some embodiments, the oxidized SiC particles are generally heated to a temperature of 900° C. to 1100° C. Additionally, the SiC particles can be heated for any desired time period. In some embodiments, the SiC particles are heated for a time period of 30 minutes to 24 hours. Temperature and time period over which the oxidized SiC particles are heated can be selected according to several considerations including, but not limited to, desired structural features and properties of the silica interparticle phase and composite carbide composition, such as strength and density. FIG. 6 illustrates change in compressive strength of the composite carbide composition as a function of heating temperature and time according to some embodiments. Moreover, FIG. 7 illustrates change in density of the composite carbide composition as a function of heating temperature and time according to some embodiments. Generally, growth of the silica interparticle phase increases at higher temperatures and longer heating times. As a result, specific properties of the composite carbide composition can be tailored in the fabrication process. FIG. 8 provides FTIR spectra of two composite carbide compositions heated at differing temperatures and over differing time periods in comparison to a control group of non-oxidized SiC particles. The composite carbide composition heated at 1100° C. for 4 hours shows pronounced Si—O and Si—O—Si vibrations corresponding to a robust silica interparticle phase covalently bound to the SiC particles. The composite carbide composition heated at 900° C. for 2 hours shows weaker Si—O—Si vibrations indicating a less developed silica interparticle phase.

In some embodiments, the silanol functionalities undergo condensation reactions prior to the heating process. The condensation reactions can produce an amorphous silica gel layer. The amorphous silica gel layer can exhibit high porosity and surface area. These physicochemical characteristics of the silica gel layer can facilitate its crystallization when heat is added. The presence of the Na ions and/or other dopants can promote the nucleation of crystalline $SiO_2$ that continues to grow on the SiC surface. In addition, the Na ions and/or other dopants are network modifiers that increase the release and mobility of the silicate ions during crystal growth. Finally, the gel porosity enables oxygen diffusion towards the SiC surface, which creates more $SiO_2$ for crystal growth. In some embodiments, other silicate phases can be grown on SiC surfaces by the presence of dopants and/or gas flow characteristics during the heating process. Additionally, nitrogen in the atmosphere during heat treatment can be incorporated into the silica interparticle phase as a silicon nitride. Dopants and associated phases incorporated into the silica interparticle phase can be employed to engineer the mechano-physical properties of the composite carbide composition.

Articles comprising composite carbide compositions can be easily fabricated according to methods described herein. In some embodiments, silicon carbide particles can be added to a mold and oxidized to form surface silanol functionalities. The oxidized SiC particles are subsequently heated in the mold to provide the article comprising the SiC particles and covalently bound silica interparticle phase. In this way, an SiC article having desirable mechanical properties is provided without sintering at high temperatures and high pressures.

Alternatively, articles can be fabricated from composite carbide compositions described herein via one or more additive manufacturing techniques. A method of making a composite carbide article comprises forming a green article by successively depositing a plurality of layers of SiC particles, wherein liquid oxidant-binder is selectively deposited on each layer according to design of the composite carbide article in electronic format. The green article is heated to produce the composite carbide article comprising a crystalline silica interparticle phase covalently bonded to the SiC particles. The composite carbide composition of the article can have any properties and/or features described in Section I above.

Turning now to specific steps, a layer of SiC particles is deposited on a platform in a build chamber. The layer can comprise micron size SiC particles or a mixture of SiC microparticles and SiC nanoparticles, as described above. The liquid oxidant-binder is selectively deposited on the SiC layer according to design of the article in electronic format. The electronic format of the article design can be sectioned into a layer-by-layer presentation. Accordingly, selective administration of the liquid oxidant-binder to a particular SiC layer depends on location of the SiC layer in the overall article structure. The liquid oxidant-binder forms surface silanol functionalities on the SiC particles. The silanol functionalities may undergo condensation reactions to form a silica gel. The silica gel may assist in binding the particles during green article formation. The platform is subsequently lowered, another layer of SiC particles is provided and the liquid binder-oxidant is selectively administered. This process is repeated until completion of the green article. In this way, the green article is built layer by layer. Upon completion, the green article is heated to produce the composite carbide article comprising a crystalline silica interparticle phase covalently bonded to the SiC particles. In some embodiments, binder jetting additive manufacturing apparatus can be employed in production of the green part according to methods described herein.

Articles of any design comprising composite carbide compositions can be fabricated according to the present methods. In some embodiments, a composite carbide article is optical apparatus for ground- and space-based imaging systems, such as telescopes and satellites. In other embodiments, a composite carbide article functions as armor for personnel and/or equipment, including vehicles.

These and other embodiments are further illustrated by the following non-limiting examples.

Example 1—Composite Carbide Compositions

Composite carbide compositions comprising SiC particles and a silica interparticle phase covalent bonded to the SiC particles were prepared using a NaOH-water binder and two SiC powder diameters: 40 µm and 80 nm. The binder-powder slurry was mixed and then introduced into a 10 mm diameter cylindrical cavity to form a 15 mm long cylindrical sample. Minimal hand pressure was used to compact the slurry in the mold using a ram. This approach was implemented to simplify testing, while still mimicking the eventual powder bed, binder jetting process where moderate pressure is applied by the roller from one powder layer to the next. Various heating profiles were then selected. In all cases, the temperature was ramped to 100° C. at 1° C./min and held for 6 hrs. This was followed by another 1° C./min ramp to 350° C. with a second 6 hr hold. This standard profile was then completed by a 5° C./min ramp to the final temperature between 900° C. and 1100° C. Hold times of 2 to 24 hrs were applied for the final temperature. Table III summarizes the properties of the composite carbide compositions resulting from various temperatures and heating times.

TABLE III

Composite Carbide Compositions

| Heat treat | Density (g/cm³) | Strength (MPa) |
| --- | --- | --- |
| 900° C., 2 hrs | 1.65 | 76 |
| 1000° C., 2 hrs | 1.84 | 91 |
| 1100° C., 2 hrs | 1.88 | 119 |
| 1100° C., 4 hrs | 1.90 | 151 |

To better understand the nature of the silica interparticle phase, SEM-EDX (energy dispersive X-ray) measurements were performed on a silica fiber cluster. The SEM-EDX results are provided in Table IV. The 2:1 atomic percentage between oxygen (O) and silicon (Si) suggests that the fiber interparticle phase are indeed $SiO_2$. The presence of sodium (Na) is minor (6.66 atomic %). Na can exist in either an interstitial or free-state; and can aid in the crystal growth by serving as a nucleation site

TABLE IV

EDX Analysis

| Element | Concentration | Weight % | Weight % std. dev. | Atomic % |
| --- | --- | --- | --- | --- |
| O | 5.49 | 48.67 | 0.19 | 61.72 |
| Na | 1.41 | 7.55 | 0.08 | 6.66 |
| Si | 6.21 | 43.78 | 0.17 | 31.62 |
| Total | | 100.00 | | 100.00 |

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A composite carbide composition comprising:
   silicon carbide (SiC) particles; and
   a silica interparticle phase covalently bonded to the SiC particles, wherein
   the composite carbide composition has an average pore size of 1-20 µm, and wherein the silica interparticle phase bridges the SiC particles.

2. The composite carbide composition of claim 1, wherein the silica interparticle phase is crystalline.

3. The composite carbide composition of claim 1, wherein the silica interparticle phase exhibits a fiber morphology.

4. The composite carbide composition of claim 1, wherein the silica interparticle phase exhibits plate-like morphology.

5. The composite carbide composition of claim 1, wherein the SiC particles have a bi-modal particle size distribution.

6. The composite carbide composition of claim 1, wherein the SiC particles have a multi-modal particle size distribution.

7. The composite carbide composition of claim 1, wherein the SiC particles comprise a mixture of SiC microparticles and SiC nanoparticles.

8. The composite carbide composition of claim 7, wherein the SiC nanoparticles constitute 10-70 weight percent of the SiC particles.

9. The composite carbide composition of claim 7, wherein the SiC nanoparticles constitute 20-60 weight percent of the SiC particles.

10. The composite carbide composition of claim 1 having density greater than 80 percent theoretical density of SiC.

11. The composite carbide composition of claim 1 having compressive strength of at least 50 MPa.

12. The composite carbide composition of claim 1, wherein the silica interparticle phase comprises alkali metal.

13. A composite carbide composition comprising:
    silicon carbide (SiC) particles; and
    a silica interparticle phase covalently bonded to the SiC particles, wherein the composite carbide composition has a compressive strength of at least 50 MPa.

14. The composite carbide composition of claim 13, wherein the silica interparticle phase is crystalline.

15. The composite carbide composition of claim 13, wherein the silica interparticle phase exhibits a fiber morphology.

16. The composite carbide composition of claim 13, wherein the silica interparticle phase exhibits plate-like morphology.

17. The composite carbide composition of claim 13, wherein the silica interparticle phase bridges the SiC particles.

18. The composite carbide composition of claim 13, wherein the SiC particles have a bi-modal particle size distribution.

19. The composite carbide composition of claim 13, wherein the SiC particles have a multi-modal particle size distribution.

20. The composite carbide composition of claim 13, wherein the SiC particles comprise a mixture of SiC microparticles and SiC nanoparticles.

21. The composite carbide composition of claim 20, wherein the SiC nanoparticles constitute 10-70 weight percent of the SiC particles.

22. The composite carbide composition of claim 20, wherein the SiC nanoparticles constitute 20-60 weight percent of the SiC particles.

23. The composite carbide composition of claim 13 having density greater than 80 percent theoretical density of SiC.

24. The composite carbide composition of claim 13 having compressive strength in the range 50 MPa to 200 MPa.

25. The composite carbide composition of claim 13, wherein the silica interparticle phase comprises alkali metal.

26. The composite carbide composition of claim 13, wherein the composite carbide composition has an average pore size of 1-20 μm.

* * * * *